(12) United States Patent
Jousse (10) Patent No.: US 8,817,450 B2
(45) Date of Patent: Aug. 26, 2014

(54) DEVICE FOR ENERGIZING AN IGNITION OUTPUT STAGE

(75) Inventor: Alain Jousse, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 13/126,728

(22) PCT Filed: Sep. 2, 2009

(86) PCT No.: PCT/EP2009/061309
§ 371 (c)(1),
(2), (4) Date: Jul. 5, 2011

(87) PCT Pub. No.: WO2010/049194
PCT Pub. Date: May 6, 2010

(65) Prior Publication Data
US 2011/0255207 A1   Oct. 20, 2011

(30) Foreign Application Priority Data

Oct. 28, 2008  (DE) .......................... 10 2008 043 233

(51) Int. Cl.
| | | |
|---|---|---|
| *F23Q 3/00* | (2006.01) | |
| *F23Q 5/00* | (2006.01) | |
| *F23Q 7/00* | (2006.01) | |
| *G01V 1/06* | (2006.01) | |
| *B60R 21/017* | (2006.01) | |

(52) U.S. Cl.
CPC .................................... B60R 21/017 (2013.01)
USPC ....................................................... 361/247

(58) Field of Classification Search
USPC .......... 361/247, 248; 280/735; 307/10.1, 10.6
See application file for complete search history.

(56) References Cited

U.S. PATENT DOCUMENTS

| | | | |
|---|---|---|---|
| 5,420,790 A | | 5/1995 | Ravas et al. |
| 5,539,610 A | * | 7/1996 | Williams et al. ............... 361/246 |
| 5,751,507 A | * | 5/1998 | Watt et al. ........................ 361/56 |
| 2004/0108698 A1 | | 6/2004 | Rothleitner |

FOREIGN PATENT DOCUMENTS

| | | |
|---|---|---|
| DE | 10 2004 010 135 | 9/2005 |
| DE | 10 2005 045 233 | 3/2007 |
| EP | 0 794 094 | 9/1997 |
| FR | 2 815 919 | 5/2002 |
| WO | WO 2007/090417 | 8/2007 |

OTHER PUBLICATIONS

International Search Report for PCT/EP2009/061309, dated Dec. 16, 2009.

* cited by examiner

*Primary Examiner* — Rexford Barnie
*Assistant Examiner* — Christopher Clark
(74) *Attorney, Agent, or Firm* — Kenyon & Kenyon LLP (57) ABSTRACT

A device is provided for energizing a power output stage, that has a transistor, a capacitor and a supply circuit. The transistor has a control input and is designed to supply a firing current as a function of a control voltage that is present at the control input. The capacitor, which is connected to the control input of the transistor, is designed to supply the control voltage to the control input. The supply circuit has a resistor that is connected between the capacitor and a supply voltage terminal, the supply circuit being designed to charge the capacitor via the resistor to the control voltage.

15 Claims, 8 Drawing Sheets

PRIOR ART

DEVICE FOR ENERGIZING AN IGNITION OUTPUT STAGE

FIELD OF THE INVENTION

The present invention relates to a device for energizing an ignition output stage.

BACKGROUND INFORMATION

German Published Patent Application 10 2004 010135 describes a device for energizing an ignition output stage using a firing current from an energy reserve. A voltage regulator, whose function is to adjust a voltage at the at least one voltage output stage to a predefined value, is provided between the energy reserve and the ignition output stage. The voltage regulator is configured in an ASIC.

Figure 6:
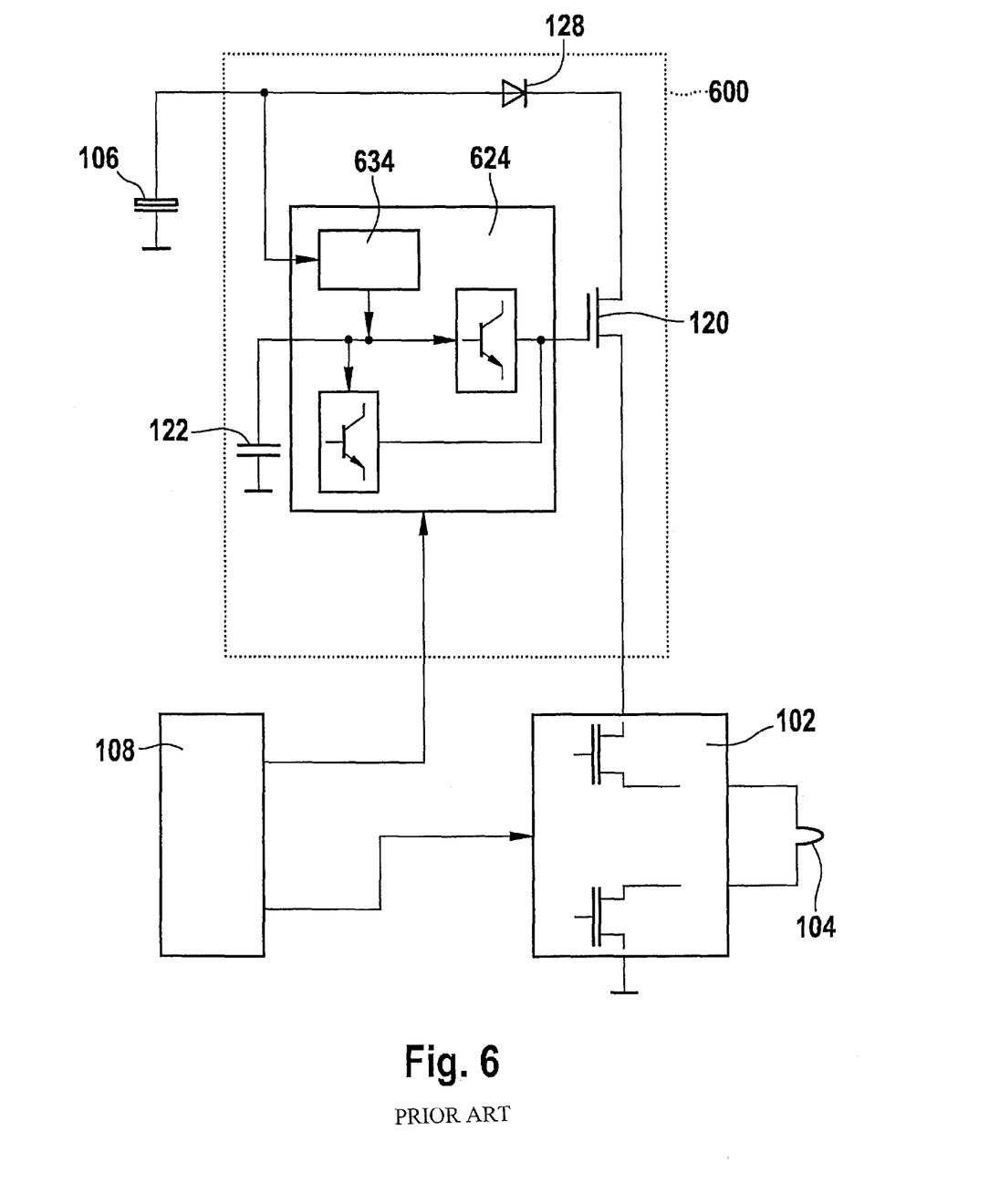
FIG. 6 a block diagram of a device according to the related art.

FIG. 6 shows a block diagram of a voltage pre-regulator for ignition output stages in accordance with a conventional system. A device 600 is shown that is designed to supply a firing current to an ignition output stage 102. The ignition output stage 102 is designed to trigger a firing pellet 104. The device 600 is connected to an energy reserve 106 and to a microcontroller 108. The device 600 has an N-channel MOSFET 120 for supplying the firing current. The firing current is supplied by a source terminal of the N-channel MOSFET 120. A drain terminal of the N-channel MOSFET 120 is connected via a diode 128 to the energy reserve 106. A gate voltage of the N-channel MOSFET 120 is supplied by a capacitor 122 via an ASIC 624. ASIC 624 has a charge pump 634 and two transistor circuits. Microcontroller 108 is designed to supply an ON/OFF signal to ASIC 624 in order to interrupt a supplying of the firing current. In addition, microcontroller 108 is designed to supply a "firing" signal to ignition output stage 102. A connection between device 624 and the source of MOSFET 120 is not shown in FIG. 6.

Thus, the functions for supplying the firing current are integrated in the transistor 120 and the ASIC 624. The ASIC 624 is designed for regulating the external N-channel MOSFET transistor 120 in a source follower architecture. In this context, the ASIC 624 keeps the gate terminal of the transistor 120 at a predefined voltage, respectively regulates it thereto. The source terminal follows the gate ($V_{SOURCE} = V_{GATE} - V_{GS(th)}$), and the firing current regulated by the ignition output stages flows over the MOSFET transistor 120. The entire ASIC 624 is powered by a charge pump 634 and the external capacitor 122. The charge pump 634 ensures that the gate voltage of the MOSFET transistor 120 holds its value, even in the case of a sudden dip in the power supply 106 (energy reserve voltage) during firing, so that the MOSFET transistor 120 is able to be switched through at the lowest possible resistance $R_{DS(ON)}$.

SUMMARY

Example embodiments of the present invention provide that a voltage pre-regulator for ignition output stages that has turn-off capability may be implemented using discrete components. Thus, there is no need for an ASIC. In particular, the charge pump used in known methods heretofore may be replaced by a simple supply circuit. This is possible since the capacitor used for driving the MOSFET transistor may be used in accordance with example embodiments of the present invention exclusively for charging the gate of the transistor and not for supplying other circuit elements. Thus, it is possible to ensure that the gate voltage across the transistor is maintained, even in the case of a drop in the energy reserve, due, for example, to an ignition pulse.

The approach described herein advantageously makes it possible to substantially reduce the number of required components. Since the expensive ASIC used in known methods heretofore becomes superfluous, and the circuit may be discretely designed more cost effectively, a significant cost reduction is achieved.

Example embodiments of the present invention provide a device for energizing an ignition output stage, including the following features: a transistor having a control input, the transistor being designed to supply a firing current as a function of a control voltage that is being applied to the control input; a capacitor, which is connected to the control input of the transistor and is designed to supply the control voltage to the control input; and a supply circuit having a resistor that is connected between the capacitor and a supply voltage terminal, the supply circuit being designed to charge the capacitor via the resistor to the control voltage.

The device may be used for triggering a restraint device in the case of an accident of a vehicle. For example, the firing current may be suited for activating a firing pellet of an airbag. The transistor may be designed as an N-channel MOSFET (metal-oxide semiconductor field effect transistor) having a gate terminal as a control input and a source terminal for supplying the firing current. If the control voltage exceeds a threshold voltage of the transistor, the transistor becomes conductive and is able to supply the firing current. The capacitor may have a capacitance that is suited for charging the gate terminal to the threshold voltage. The supply voltage terminal is suited for connecting the device to an energy reserve. The firing current and the control voltage may be supplied from the energy reserve. The supply circuit may be exclusively composed of discrete components. The resistor may be constituted of a resistor element, an internal resistance of a circuit element of the supply circuit, or of a line resistance. The control voltage may correspond to a supply voltage that is present at the supply voltage terminal, minus a voltage dropping across the resistor. Thus, a maximum control voltage is less than a maximum supply voltage.

The transistor may have an input that is connected to the supply voltage terminal. The input may be a drain terminal. If the control voltage present at the control input of the transistor exceeds the threshold voltage of the transistor, the transistor becomes conductive, and the firing current may be supplied from the energy reserve via the transistor to the ignition output stage.

In accordance with an example embodiment, the supply circuit may have a component that is designed to prevent a discharging of the capacitor over the resistor. Thus, the control voltage may even be maintained when the supply voltage falls below the value of the control voltage, for example, in the case of a firing of the ignition output stage. The component may be a diode. In addition, the component may be a transistor. In this context, the resistor may be at least partially constituted of an internal resistance of the component. If the resistor is completely constituted of the internal resistance of the component, a separate resistor is not needed.

In accordance with an example embodiment, the supply circuit may be a Zener diode that is connected to the capacitor in order to stabilize the control voltage. Thus, the control voltage becomes independent of the energy reserve. If, in the event of an accident, the supply circuit is separated from the energy reserve, the gate terminal of the transistor is nevertheless able to be further charged to enable the firing current to be supplied.

In addition, the device may have one or two series resistors that are connected between the capacitor and the supply circuit output, respectively between the capacitor and the switch described below. A voltage dropping across the series resistor may be used for diagnostic purposes.

In accordance with an example embodiment, the device has a switch that is designed for providing an electrical connection between the control input and an output of the transistor as a function of a switching signal. Thus, the voltage potentials at the gate terminal and at the source terminal may be equalized, and the transistor may be blocked. The firing current supply is thereby interrupted.

Example embodiments of the present invention are described in greater detail in the following with reference to the appended figures.

DETAILED DESCRIPTION

In the following figures, the same or similar elements may be denoted by the same or similar reference numerals. In addition, the figures of the drawings, and the description thereof include numerous features in various combinations. It is evident to one skilled in the art that these features may also be considered individually, or they may be combined in different ways that are not explicitly described here.

Figure 1:
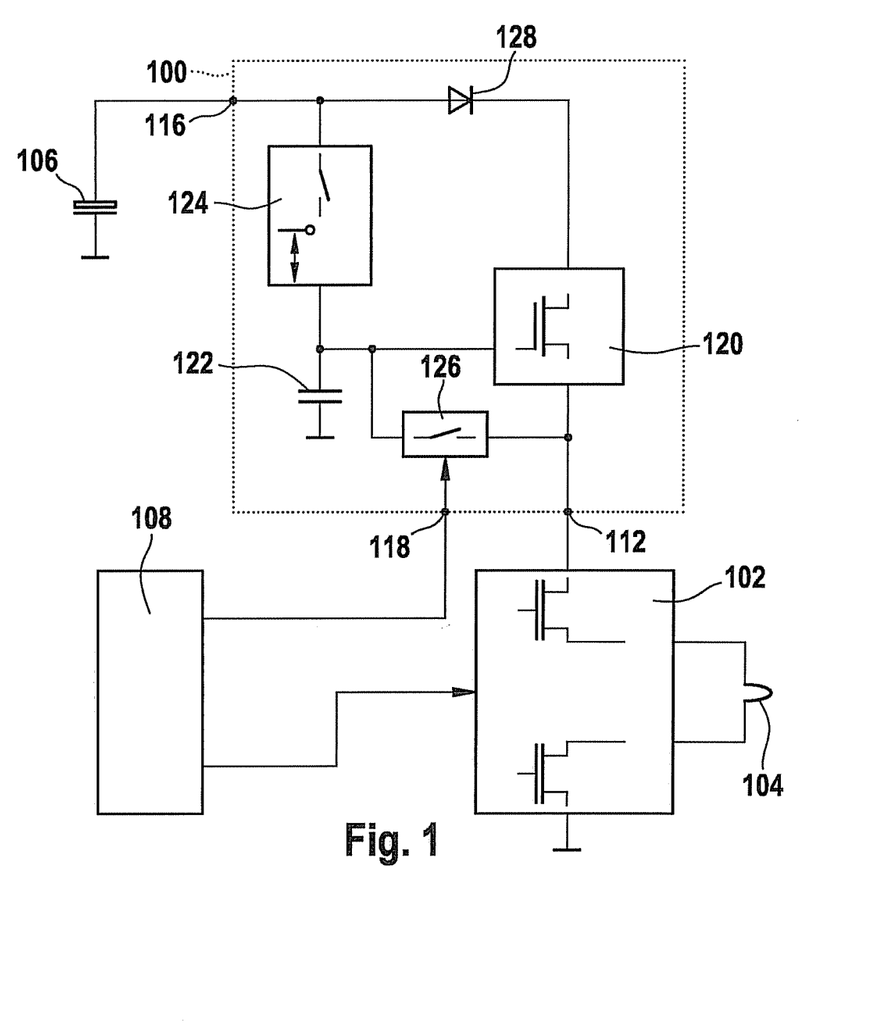
FIG. 1 a block diagram of a first exemplary embodiment of the present invention.

FIG. 1 shows a block diagram of a device 100 for energizing an ignition output stage 102 in accordance with an exemplary embodiment of the present invention. Device 100 may be a discrete voltage pre-regulator for ignition output stages that has turn-off capability.

Device 100 is designed to supply a firing current to an ignition output stage 102. Ignition output stage 102 may be designed to trigger a firing pellet 104. In addition, device 100 is coupled to an energy reserve 106 and to a microcontroller (μC) 108.

Device 100 has an output 112 for outputting the firing current to ignition output stage 102. In addition, device 100 has a supply voltage terminal 116 via which it may be connected to energy reserve 106. Energy reserve 106 may have a plurality of capacitors, preferably electrolytic capacitors. Device 100 is connected via a switch terminal 118 to the microcontroller. Microcontroller 108 may supply a switching signal (ON/OFF) via switch terminal 118 to device 100. The switching signal may control the supplying of the firing current. In addition, microcontroller 108 may supply a firing signal to ignition output stage 102.

Device 100 has an N-channel MOSFET 120. N-channel MOSFET 120 has a drain terminal, a gate terminal and a source terminal. In addition, device 100 has a capacitance or a capacitor 122, a supply circuit 124, a switch 126 and a diode 128. A drain terminal of N-channel MOSFET 120 is connected via a diode 128 to the supply voltage terminal. Source terminal of N-channel MOSFET 120 is connected to output 112. Gate terminal of N-channel MOSFET 120 is connected to a first terminal of capacitor 122. Capacitor 122 may be connected such that it is able to be used exclusively for charging the gate electrode of N-channel MOSFET 120. A second terminal of capacitor 122 is connected to ground. A first terminal of supply circuit 124 is connected to supply voltage terminal 116. A second terminal of supply circuit 124 is connected to the first terminal of capacitor 122. A first terminal of switch 126 is connected to the gate terminal of N-channel MOSFET 120. A second terminal of switch 126 is connected to the source terminal of N-channel MOSFET 120. A third terminal of switch 126 is connected to switch terminal 118.

Supply circuit 124 is designed to supply a control voltage $V_{ref}$ to capacitor 122. To this end, the design of supply circuit 124 may provide for connecting the first terminal of capacitor 122 via a resistor to supply voltage terminal 116. A voltage drop occurs across the resistor. Thus, capacitor 122 is not able to be fully charged to the supply voltage that is present at supply voltage terminal 116. The resistor may be constituted of a line resistance, a discrete, passive component, or the internal resistance of a diode or of a transistor of supply circuit 124. Possible exemplary embodiments of supply circuit 124 are shown in FIG. 2a through 2f.

Figure 3A:
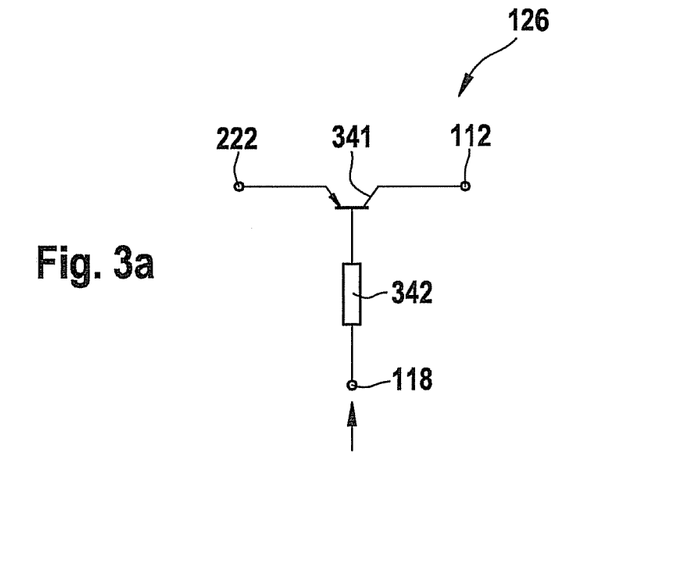
FIG. 3a, 3b circuit diagrams of a switch in accordance with exemplary embodiments of the present invention.
Figure 3B:
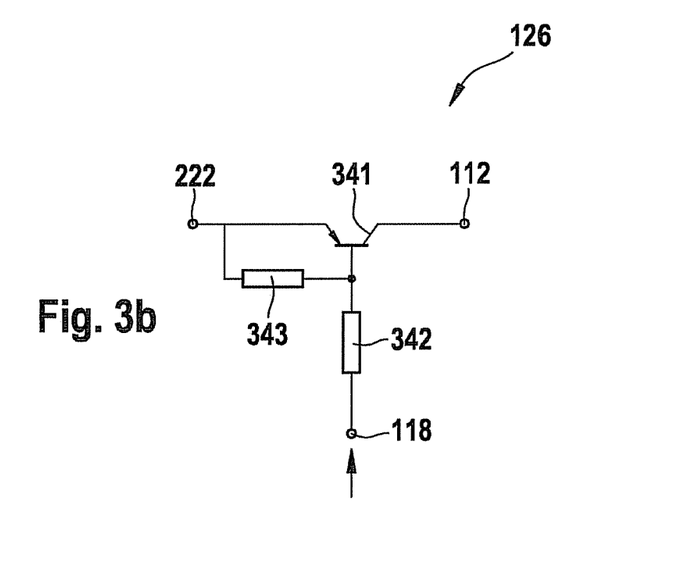

Switch 126 is designed for controlling the supplying of the firing current. The control may operate in response to the switching signal supplied by microcontroller 108. To block transistor 120, switch 126 may be designed to trigger a short circuit between the gate terminal and the source terminal of transistor 120. Nevertheless, a low current may flow in this case for diagnostic purposes. Possible exemplary embodiments of switch 126 are shown in FIGS. 3a and 3b.

In accordance with example embodiments of the present invention, capacitor 122 (>10 nF), that has been precharged to a defined voltage, is installed directly at the gate of N-channel MOSFET transistor 120. In the case of the firing, this capacitor 122 is used as a buffer capacitor for holding the voltage at the gate at its value when there is a sudden dip in supply voltage 106. Thus, capacitor 122 fulfills the function of the charge pump of the ASIC design shown in FIG. 6. The supply voltage fed from energy reserve 106 may be stable until the occurrence of the first firing.

Supply circuit 124 has the functions of a switch and of a reference voltage. The switch may be designed for preventing capacitor 122 from being discharged in response to a low supply voltage. For example, the switch may be designed as a diode or transistor and be configured between the gate terminal of transistor 120 and power supply 106. The reference voltage is provided for charging gate capacitor 122 and, consequently, is provided for the source (source follower architecture).

Switch 126 controlled by microcontroller 108 may be installed between the gate and source of transistor 120 in order to switch off MOSFET transistor 122 (switch is on). The switching-off process may take place, in particular, when the firing current flow is not permitted. In this case, there must be a sudden dip in the voltage at the source. In addition, switch 126 is designed to turn on MOSFET transistor 122 (switch is off), in order to realize the source follower architecture and ensure that gate capacitor 122 is not discharged. Switch 126 may be designed, for example, as a diode or transistor.

In accordance with an exemplary embodiment, in place of one single MOSFET transistor 120, a plurality of transistors may be used. This may be a question of different transistors.

FIG. 2a through 2f show exemplary embodiments of supply circuit 124. Supply circuits 124 shown each have supply voltage terminal 116 and a capacitor terminal 222. In addition, supply circuits 124 may have a ground connection.

Supply circuits 124 may be connected via supply voltage terminal 116 to the energy reserve. Supply circuits 124 may be connected via capacitor terminal 222 to the gate terminal of transistor 120 (shown in FIG. 1) and to capacitor 122 (shown in FIG. 1).

Figure 2A:
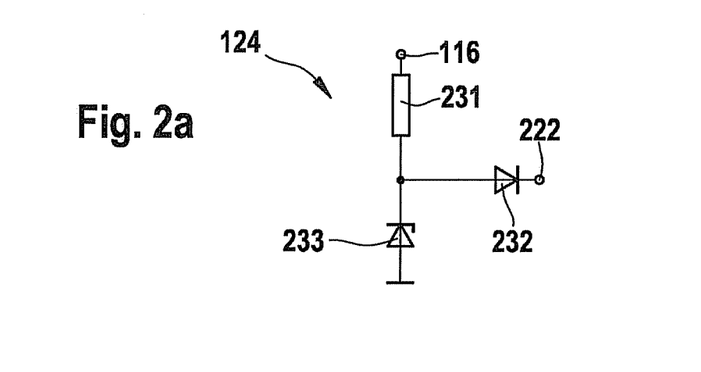
FIGS. 2a-2f circuit diagrams of a supply circuit in accordance with exemplary embodiments of the present invention.

FIG. 2a shows a circuit diagram of a supply circuit 124 having a resistor 231, a diode 232 and a Zener diode 233. A first terminal of resistor 231 is connected to supply voltage terminal 116. A second terminal of resistor 231 is connected via diode 232 to capacitor terminal 222 and via Zener diode 233 to ground. Diode 232 is connected in a manner that prevents the capacitor from discharging over resistor 231. Zener diode 233 is connected in a manner that permits stabilization or charging of the capacitor.

Figure 2B:
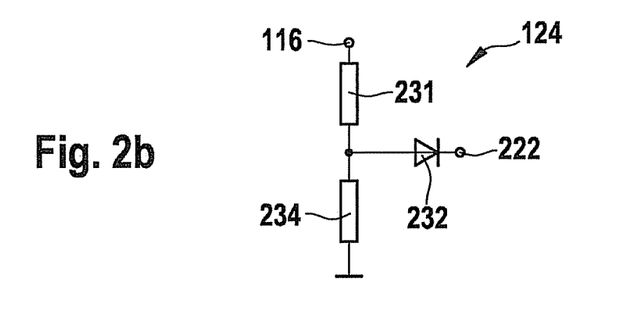

FIG. 2b shows a circuit diagram of another supply circuit 124 having resistor 231, diode 232 and another resistor 234. The first terminal of resistor 231 is connected to supply voltage terminal 116. The second terminal of resistor 231 is connected via diode 232 to capacitor terminal 222 and via further resistor 234 to ground. Diode 232 is connected in a manner that prevents the capacitor from discharging over resistor 231.

Figure 2C:
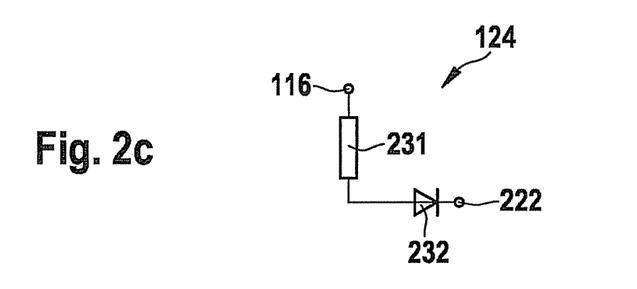

FIG. 2c shows a circuit diagram of another supply circuit 124 having resistor 231 and diode 232. The first terminal of resistor 231 is connected to supply voltage terminal 116. The second terminal of resistor 231 is connected via diode 232 to capacitor terminal 222. Diode 232 is connected in a manner that prevents the capacitor from discharging over resistor 231.

Figure 2D:
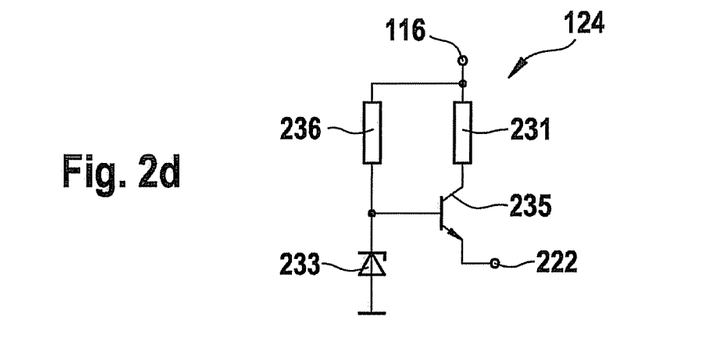

FIG. 2d shows a circuit diagram of another supply circuit 124 having resistor 231, a transistor 235, another resistor 236 and a Zener diode 233. Transistor 235 may be designed as an NPN bipolar transistor. The first terminal of resistor 231 is connected to supply voltage terminal 116. The second terminal of resistor 231 is connected to a collector of transistor 235. The emitter of transistor 235 is connected to capacitor terminal 222. The base of transistor 235 is connected via further resistor 236 to supply voltage terminal 116 and via Zener diode 233 to ground. Zener diode 233 is connected in a way that permits stabilization or charging of the capacitor. Transistor 235 is connected in a manner that prevents the capacitor from discharging over resistor 231.

Figure 2E:
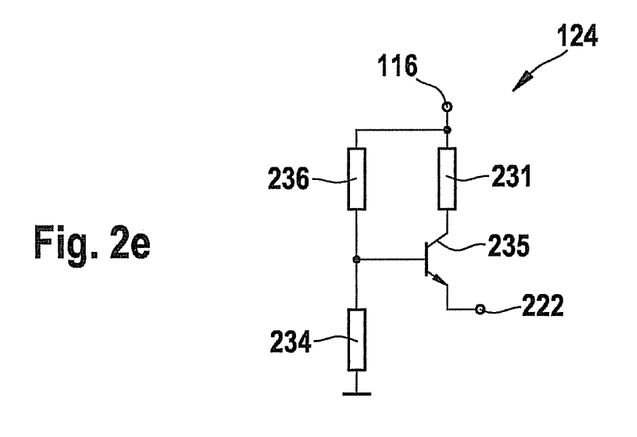

FIG. 2e shows a circuit diagram of another supply circuit 124 having resistor 231, transistor 235 and other resistors 234, 236. Transistor 235 may be designed as an NPN bipolar transistor. The first terminal of resistor 231 is connected to supply voltage terminal 116. The second terminal of resistor 231 is connected to the collector of transistor 235. The emitter of transistor 235 is connected to capacitor terminal 222. The base of transistor 235 is connected via further resistor 236 to supply voltage terminal 116 and via further resistor 234 to ground. Transistor 235 is connected in a manner that prevents the capacitor from discharging over resistor 231.

Figure 2F:
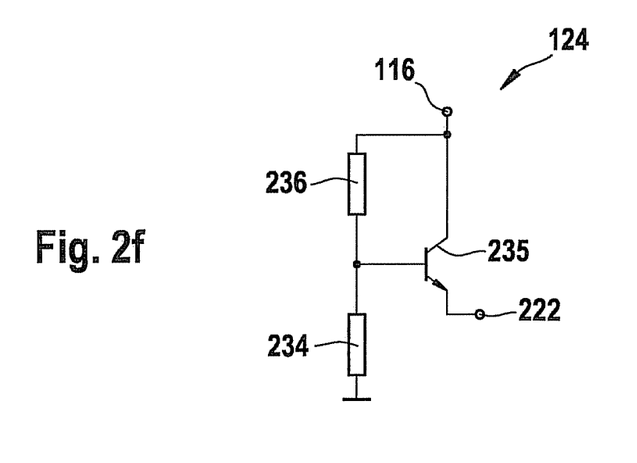

FIG. 2f shows a circuit diagram of another supply circuit 124 having transistor 235 and other resistors 234, 236. Transistor 235 may be designed as an NPN bipolar transistor. The collector of transistor 235 is connected to supply voltage terminal 116. The emitter of transistor 235 is connected to capacitor terminal 222. The base of transistor 235 is connected via further resistor 236 to supply voltage terminal 116 and via further resistor 234 to ground. Transistor 235 is connected in a manner that prevents the capacitor from discharging over resistor 231.

FIG. 3a through 3b show exemplary embodiments of switch 126. Switches 126 shown each have output 112, switch terminal 118 and capacitor terminal 222. Via output 112, switches 126 may be connected to the source terminal of transistor 120 (shown in FIG. 1) and via capacitor terminal 222 to the gate terminal of transistor 120 and to capacitor 122 (shown in FIG. 1). Via switch terminal 118, switches 126 may receive the switching signal from microcontroller 108 (shown in FIG. 1).

FIG. 3a shows a circuit diagram of a switch 126 having a transistor 341 and a resistor 342. Transistor 341 may be designed as a PNP bipolar transistor. The emitter of transistor 341 is connected to capacitor terminal 222. The collector of transistor 341 is connected to output 112. The base of transistor 341 is connected via resistor 342 to switch terminal 118.

FIG. 3b shows a circuit diagram of another switch 126 having transistor 341, resistor 342 and another resistor 343. Transistor 341 may be designed as a PNP bipolar transistor. The emitter of transistor 341 is connected to capacitor terminal 222. The collector of transistor 341 is connected to output 112. The base of transistor 341 is connected via resistor 342 to switch terminal 118 and via further resistor 343 to capacitor terminal 222.

Figure 4:
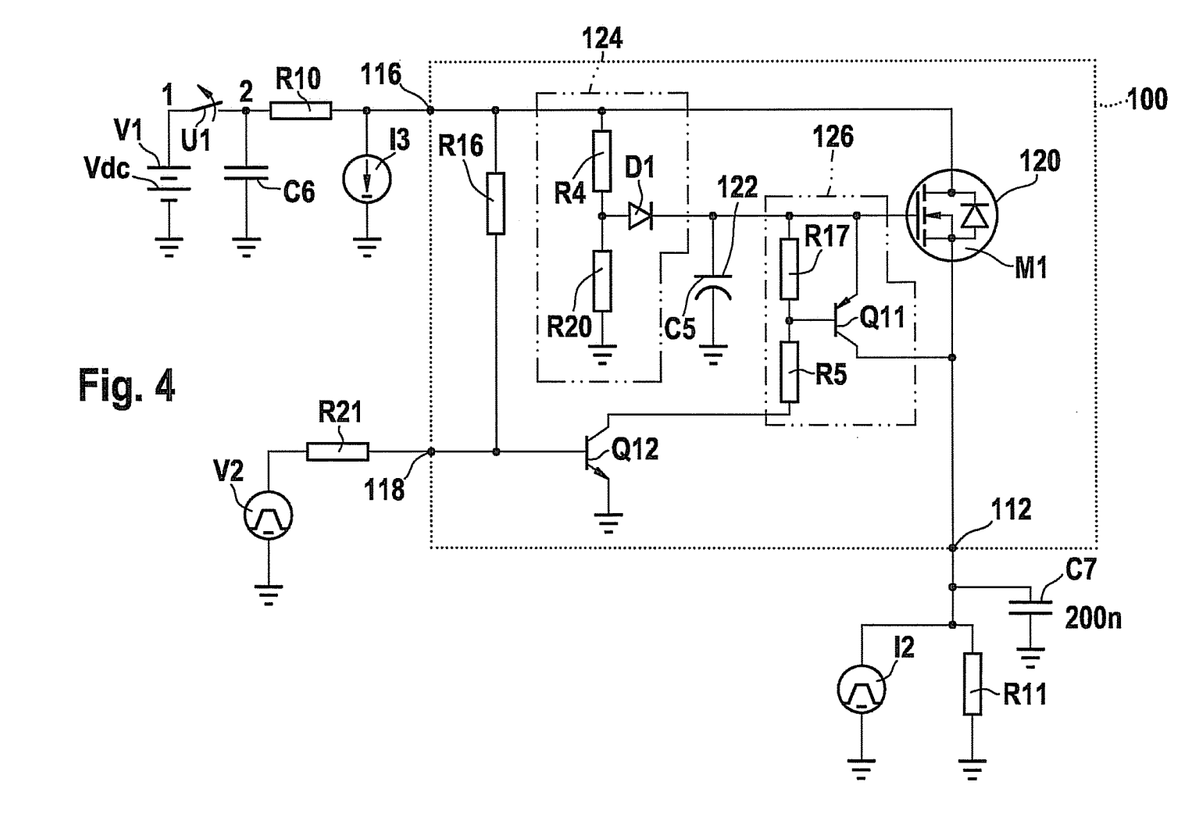
FIG. 4 a block diagram of another exemplary embodiment of the present invention.

FIG. 4 shows a block diagram of a device 100 for energizing an ignition output stage 102 in accordance with another exemplary embodiment of the present invention. The device has terminals 112, 116, 118, as well as transistor (M1) 120, capacitor 122, supply circuit 124 and switch 126.

Device 100 is designed to supply a firing current to ignition output stage 102. Ignition output stage 102 may be designed to trigger a firing pellet 104. In addition, device 100 is coupled to an energy reserve 106 and to a microcontroller (μC) 108.

Transistor 120 is designed as an N-channel MOSFET 120. The drain terminal of transistor 120 is connected to supply voltage terminal 116. The source terminal of transistor 120 is connected to output 112 in order to supply the firing current.

The gate terminal of transistor 120 is connected to capacitor (C5) 122, to supply circuit 124 and to switch 126.

Supply circuit 124 corresponds to the exemplary embodiment shown in FIG. 2b and includes two resistors R4, R20 and one diode D1.

Switch 126 corresponds to the exemplary embodiment shown in FIG. 3b and includes two resistors R5, R17 and one transistor Q11.

A pull-up resistor R16 is configured between terminals 116, 118 to control the switching signal supplied at switch terminal 118. A transistor Q12 is also provided. Transistor Q12 is switched by the switching signal and, in the conductive state, is able to connect resistor R5 to ground.

For diagnostic purposes, a series resistor may be configured between capacitor 122 and diode D1.

For diagnostic purposes, a series resistor may be configured between capacitor 122 and resistor R17.

Elements V1, U1, C6, R10, 13 simulate the energy reserve that is connected to supply voltage terminal 116. Elements V2, R21 simulate the microcontroller that is connected to switch terminal 118. Elements 12, R11, C7 simulate the ignition output stage that is connected to output 112.

Figure 5A:
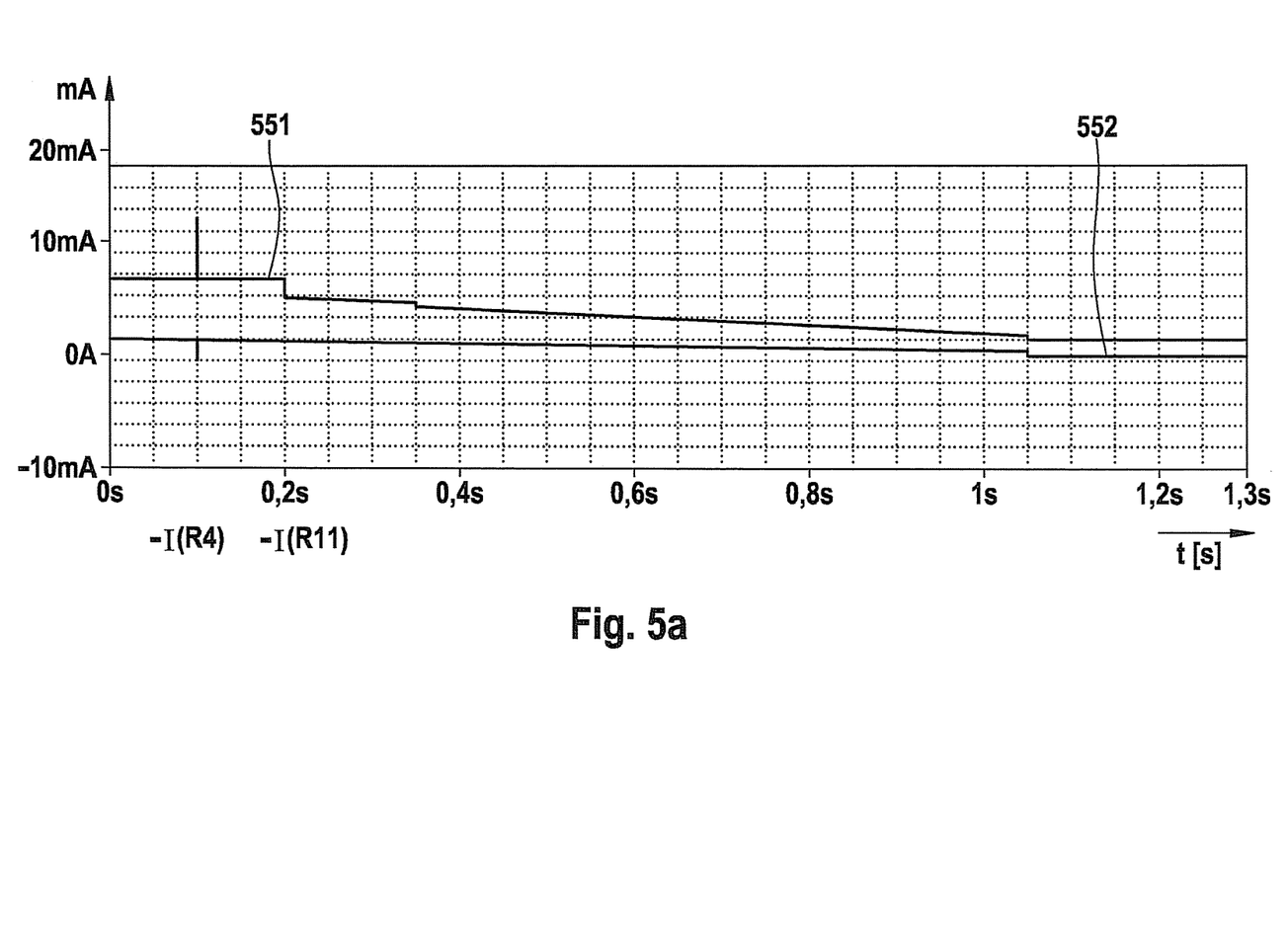
FIG. 5a, 5b characteristic curves of an exemplary embodiment of the present invention.
Figure 5B:
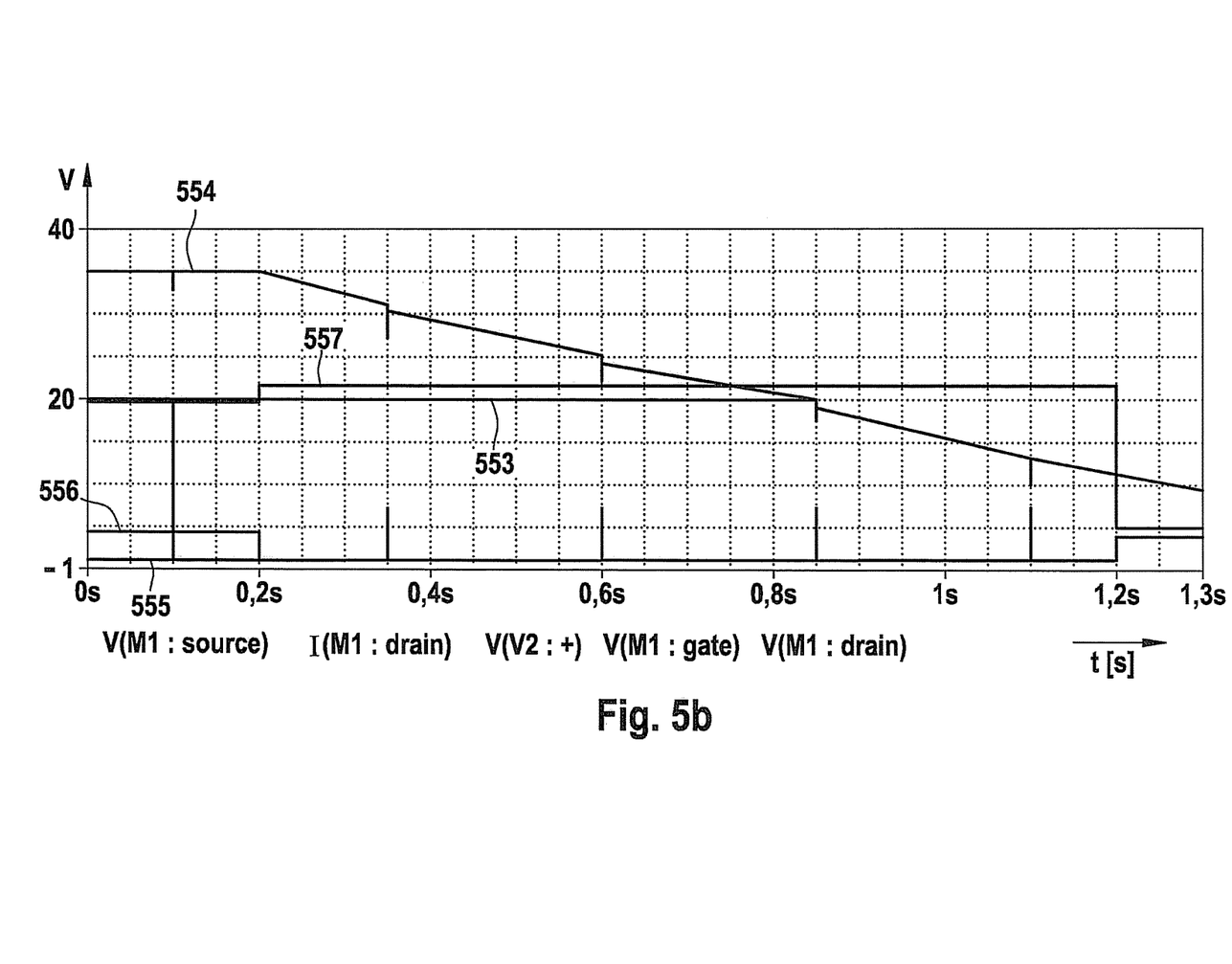

FIGS. 5a and 5b show voltage and current characteristic curves of a device according to the present invention for energizing an ignition output stage. In particular, voltage and current characteristics of the elements shown in FIG. 4 are plotted over time. In this context, FIG. 5a shows a current characteristic 551 across resistor R4 and a current characteristic 552 across resistor R11. FIG. 5b shows a voltage characteristic 553 at the source terminal of transistor M1, a voltage characteristic 554 at the drain terminal of transistor M1, a current characteristic 555 at the drain terminal of transistor M1, a voltage characteristic 556 at voltage supply V2, and a voltage characteristic 557 at the gate terminal of transistor M1.

A first firing peak is shown at 0.1 s, a second firing peak at 0.35 s, a third firing peak at 0.6 s, and a fourth firing peak at 0.85 s. Voltage characteristic 554 at the drain terminal remains at 35 V until 0.2 s since transistor M1 is blocked. A crash occurs at 0.2 s, and the blockage of transistor M1 is cancelled by a drop in voltage 556 at voltage supply V2. Voltage characteristic 554 at the drain terminal of transistor M1 subsequently falls off continuously. Although voltage characteristic 554 at the drain terminal of transistor Ml falls, voltage characteristic 557 at the gate terminal of transistor M1 remains constant. Up until the 0.75 s point in time when voltage characteristics 554, 557 are present, a high loss occurs with respect to voltage 557 that is present at the capacitor. Starting at the 0.75 s point in time, supply voltage 554 is below voltage 557 that is present at the capacitor, and no loss occurs.

The described exemplary embodiments are only selected exemplarily and may be combined with one another. In place of the described circuit elements, other suitable circuit elements may also be used that ensure the functionality in accordance with the present invention. The illustrated circuits may also be selected only exemplarily. They may be replaced by other suitable circuits. A connection among circuit elements is understood to be an electrical connection that may be implemented directly or by additional circuit elements.

What is claimed is:

1. A device for energizing an ignition output stage, comprising:
   a transistor having a control input, a second input and an output, wherein the second input is connected to a supply voltage terminal and the output is connected to the ignition output stage, and wherein the transistor is adapted to supply a firing current to the ignition output stage as a function of a control voltage that is present at the control input;
   a capacitor directly connected to the control input of the transistor and adapted to supply the control voltage to the control input; and
   a supply circuit having a resistor connected between the capacitor and the supply voltage terminal, the supply circuit adapted to charge the capacitor via the resistor to the control voltage.

2. The device according to claim 1, wherein the control voltage corresponds to a supply voltage that is present at the supply voltage terminal minus a voltage dropping across the resistor.

3. The device according to claim 1, wherein the supply circuit has a component adapted to prevent a discharge of the capacitor over the resistor.

4. The device according to claim 3, wherein the component includes a diode.

5. The device according to claim 3, wherein the component includes a transistor.

6. The device according to claim 3, wherein the resistor is at least partially constituted of an internal resistance of the component.

7. The device according to claim 1, wherein the supply circuit has a Zener diode connected to the capacitor to stabilize the control voltage.

8. The device according to claim 1, further comprising a switch adapted to provide an electrical connection between the control input and the output of the transistor as a function of a switching signal provided by a microcontroller.

9. A method for energizing an ignition output stage, comprising:
   supplying of a firing current to the ignition output stage by a transistor as a function of a control voltage that is present at a control input of the transistor, wherein the transistor further includes a second input and an output, and wherein the second input is connected to a supply voltage terminal and the output is connected to the ignition output stage;
   supplying the control voltage to the control input by a capacitor directly connected to the control input of the transistor; and
   charging the capacitor to the control voltage via a resistor of a supply circuit, the resistor connected between the capacitor and the supply voltage terminal.

10. A device for energizing an ignition output stage, comprising:
    a transistor having a control input, a second input and an output, wherein the second input is connected to a supply voltage terminal and the output is connected to the ignition output stage, and wherein the transistor is adapted to supply a firing current to the ignition output stage as a function of a control voltage that is present at the control input;
    a capacitor directly connected to the control input of the transistor and adapted to supply the control voltage to the control input; and
    a supply circuit having a resistor connected between the capacitor and the supply voltage terminal, the supply circuit adapted to charge the capacitor via the resistor to the control voltage;
    wherein the device is adapted to perform the method recited in claim 9.

11. A method for energizing an ignition output stage, comprising:
    supplying of a firing current to the ignition output stage by a transistor as a function of a control voltage that is present at a control input of the transistor, wherein the transistor further includes a second input and an output, and wherein the second input is connected to a supply voltage terminal and the output is connected to the ignition output stage;
    supplying the control voltage to the control input by a capacitor directly connected to the control input of the transistor; and
    charging the capacitor to the control voltage via a resistor of a supply circuit, the resistor connected between the capacitor and the supply voltage terminal;
    wherein the method is performed by the device recited in claim 1.

12. The device according to claim 1, wherein:
    the transistor is a MOSFET transistor;
    the second input is the MOSFET transistor's drain;
    the output is the MOSFET transistor's source; and
    the control input is the MOSFET transistor's gate.

13. The device according to claim 1, wherein the capacitor is adapted to provide a maximum voltage that is below a minimum voltage required to energize the ignition output stage.

14. The device according to claim 1, further comprising:
    a switching circuitry configured to switch the transistor on or off as a function of a switching signal provided by a microcontroller.

15. The device according to claim 14, wherein the switching circuitry is connected to the control input of the transistor and to the output of the transistor, and wherein the switching circuitry is set on to set off the transistor and the switching circuitry is set off to set on the transistor.

* * * * *